UNITED STATES PATENT OFFICE.

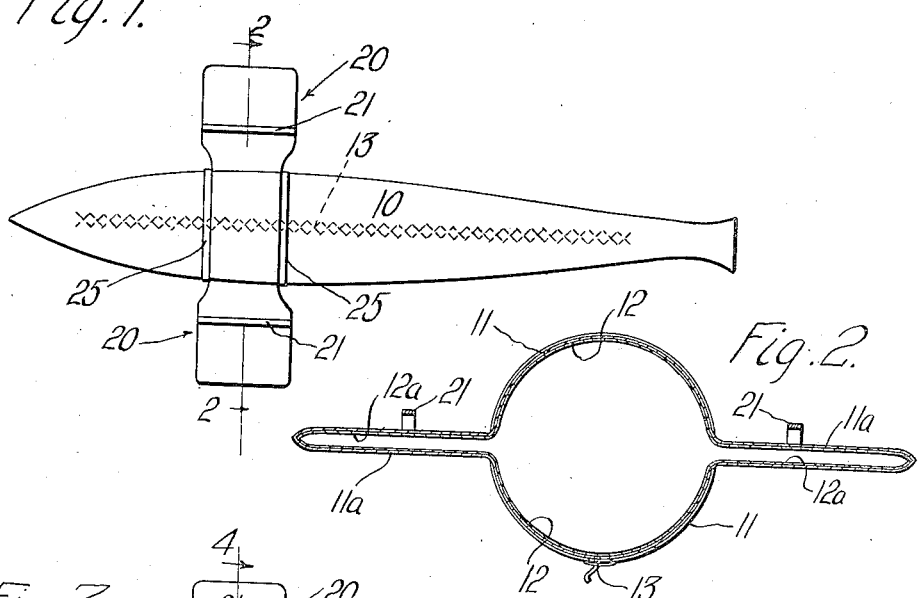

JOHN P. McCARTY AND FRITZ W. FALCK, OF LOS ANGELES, CALIFORNIA; SAID FALCK ASSIGNOR TO R. GORDON MATZENE, OF LOS ANGELES, CALIFORNIA.

SURF DIVING AND SKIMMING DEVICE.

1,222,114.             Specification of Letters Patent.      Patented Apr. 10, 1917.

Application filed February 16, 1916.    Serial No. 78,600.

*To all whom it may concern:*

Be it known that we, JOHN P. MCCARTY and FRITZ W. FALCK, citizens of the United States, residing at Los Angeles, in the county of Los Angeles, State of California, have invented new and useful Improvements in Surf Diving and Skimming Devices, of which the following is a specification.

This invention relates to devices for diving through and riding on the surf; and it is an object of this invention to provide a simple device which will enable a person with very little skill to safely ride and dive the surf without danger to him or her self; and it is also an object to provide means whereby the movements of the device may be more or less controlled and to provide means also for preventing the device from tipping or capsizing.

A preferred form of our device is explained in the following specifications, reference being had to the accompanying drawings in which Figure 1 is a plan of one form of our device. Fig. 2 is an enlarged section taken as indicated by line 2—2 on Fig. 1; Fig. 3 is a plan of a modified form of our device, and Fig. 4 is an enlarged section taken as indicated by line 4—4 on Fig. 3.

In the drawings the numeral 10 designates a float forming the body portion of our device, said float being preferably hollow, and air inflated. This float in its preferred form is made with an exterior wall of canvas, or the like, and an interior wall of rubber, or other fluid tight substance, as shown at 12, the interior wall being continuous and adapted to hold the air with which the float or body is inflated. The outer wall of the device serves to confine float or body of the device serves to confine and give shape to the inner rubber wall when the latter is inflated and may be laced together at 13 to provide for the insertion and removal of the said inner rubber tubing or wall.

The body portion 10 is preferably made in the general configuration of a fish, being substantially circular in cross section and of such a length and size as to support a person's body in the water, the person lying upon the body portion 10. Extending oppositely and laterally from the body portion we provide a pair of fins 20, which fins are buoyant, being preferably hollow and inflated with air. In the form shown in Fig. 1, these fins are shaped as shown in Figs. 1 and 2, the exterior canvas wall of the body being extended, as shown at 11ª, to form the exterior walls of the fins, and the interior rubber member being extended, as shown at 12ª, to form the interior walls of the fins. The fins, in the form shown in Figs. 1 and 2 are flexible with relation to the body, on account of their general flexible construction. The fins are located near the forward end of the body so as to come under the outstretched arms of the person using the device, the fins being grasped by the hand and operated by the arms and hand, arm or hand straps 21 may be provided on the fins. Vertical movement and manipulation of the fins enables the rider to keep the device from turning or capsizing in the water and also enables the rider to guide the device through the surf. Reinforcements or stiffeners may be used on the body. We have shown a pair of reinforcing rings 25 around the body ahead and behind the fins.

The form shown in Figs. 3 and 4 is substantially identical with the form shown in Figs. 1 and 2, except that the mode of juncture of the fins with the body is varied. In this form the interiors of the fins are not communicated with the interior of the body; but the fins are buoyant, being preferably hollow and air inflated, having an exterior wall 11ᵇ of canvas, or the like, and an interior wall 12ᵇ of rubber or the like. The two reinforcing or stiffening rings 25ᵇ carry lugs 26 in which horizontal pivots or dowel pins 27 are held; and the fins 20 are mounted upon these dowels to move vertically. The fins, in this case, may be provided with straps or other suitable means for engaging the dowel pins 27, as shown at 28.

Equipped with a device according to our invention a person may easily and safely ride the surf, skimming along on the breakers or diving through them; very little skill is required, as our device will automatically keep its balance through the laterally projecting buoyant fins which make it difficult to capsize the device, and which may be manipulated by the user, either to stabilize the device or to steer a course, or for both purposes.

Having described a preferred form of our invention, we claim:

1. A surf diving and skimming device, embodying an elongated float adapted to support a person's body, and a pair of buoyant fins projecting laterally from the body in opposite directions and flexible with relation thereto, said fins being located near one end of the body and adapted to be manipulated by a person using the device.

2. A surf diving and skimming device, embodying an elongated hollow inflatable body, and a pair of hollow inflatable fins projecting laterally from the body and flexible with relation thereto.

3. A surf diving and skimming device, embodying an elongated hollow inflatable body of substantially fish shape, and a pair of hollow inflatable fins projecting laterally from the body near its forward end vertically flexible with relation to the body.

4. A surf diving and skimming device, embodying an elongated hollow inflatable body, and a pair of hollow inflatable fins projecting laterally from the body and flexible with relation thereto, the interior of the body and the interior of the fins being in communication.

5. A surf diving and skimming device, embodying an elongated hollow inflatable body, and a pair of hollow inflatable fins projecting laterally from the body, the interior of the body and the interior of the fins being in communication.

6. A surf diving and skimming device, embodying a hollow inflatable body of flexible material, and a pair of hollow inflatable fins of flexible material joined to the body and projecting laterally therefrom, the interiors of the fins and body being in communication.

7. A surf diving and skimming device, embodying an elongated inflatable body of flexible material adapted to support a person's body, and a pair of inflatable fins of flexible material projecting laterally from the body, said fins being located near one end of the body and adapted to be manipulated by a person using the device.

8. A surf diving and skimming device, embodying an elongated buoyant body tapered toward both ends and adapted to support a person's body, and a pair of buoyant fins joined to the body and projecting oppositely laterally therefrom near one end of the body in position to be beneath the person's hands and arms.

9. A surf diving and skimming device, embodying an elongated hollow air containing body substantially circular in cross-section and tapered toward both ends, and a pair of hollow air containing fins joined to the body and projecting oppositely laterally therefrom near one end of the body in position to be beneath the person's hands and arms.

In witness that we claim the foregoing we have hereunto subscribed our names this 10th day of February, 1916.

JOHN P. McCARTY.
FRITZ W. FALCK.